US009835863B2

(12) United States Patent
Emura et al.

(10) Patent No.: US 9,835,863 B2
(45) Date of Patent: Dec. 5, 2017

(54) DISPLAY CONTROL APPARATUS, DISPLAY CONTROL METHOD, STORAGE MEDIUM, AND DISPLAY APPARATUS

(71) Applicant: Panasonic Intellectual Property Management Co., Ltd., Osaka (JP)

(72) Inventors: Koichi Emura, Kanagawa (JP); Makoto Mochizuki, Kanagawa (JP); Tetsuo Matsuse, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 175 days.

(21) Appl. No.: 14/730,222

(22) Filed: Jun. 3, 2015

(65) Prior Publication Data
US 2015/0362730 A1 Dec. 17, 2015

(30) Foreign Application Priority Data

Jun. 16, 2014 (JP) .................................. 2014-123523
Jan. 29, 2015 (JP) .................................. 2015-014954

(51) Int. Cl.
*G02B 27/01* (2006.01)
*G06K 9/00* (2006.01)
(Continued)

(52) U.S. Cl.
CPC ............ *G02B 27/017* (2013.01); *B60K 37/06* (2013.01); *G01C 21/365* (2013.01);
(Continued)

(58) Field of Classification Search
CPC .............. G02B 27/017; G02B 27/0101; G02B 2027/0141; G02B 2027/0181;
(Continued)

(56) References Cited

U.S. PATENT DOCUMENTS

2010/0003958 A1* 1/2010 Ray ..................... G10L 13/043
455/404.2
2010/0253526 A1* 10/2010 Szczerba .............. B60K 28/066
340/576
2013/0009900 A1* 1/2013 Pryor .................... B60K 35/00
345/173

FOREIGN PATENT DOCUMENTS

WO WO2008027836 * 7/2007
WO 2008/027836 3/2008
WO 2013/046428 4/2013

OTHER PUBLICATIONS

The Extended European Search Report dated Aug. 1, 2016 for the related European Patent Application No. 15171295.7.

* cited by examiner

*Primary Examiner* — Ibrahim Khan
(74) *Attorney, Agent, or Firm* — Greenblum & Bernstein, P.L.C.

(57) ABSTRACT

A display control apparatus includes: an input unit that receives state information indicating at least one of a state of a moving object, a state of inside of the moving object, and a state of outside of the moving object; and a controller that controls a displayer, which generates a predetermined image and outputs the predetermined image onto a display medium, based on the state information. The predetermined image shows a presentation image including text, when displayed on the display medium. The controller causes the displayer to generate a first predetermined image showing a first presentation image including first text corresponding to a predetermined event, determines whether the at least one state has made a predetermined change, based on the state information, and causes the displayer to generate a second predetermined image showing a second presentation image (Continued)

including second text corresponding to the predetermined event.

8 Claims, 7 Drawing Sheets

(51) Int. Cl.
*B60K 37/06* (2006.01)
*G01C 21/36* (2006.01)

(52) U.S. Cl.
CPC ..... *G02B 27/0101* (2013.01); *G06K 9/00785* (2013.01); *G06K 9/00805* (2013.01); *G06K 9/00845* (2013.01); *B60K 2350/2052* (2013.01); *G02B 2027/014* (2013.01); *G02B 2027/0141* (2013.01); *G02B 2027/0178* (2013.01); *G02B 2027/0181* (2013.01); *G02B 2027/0187* (2013.01); *G02B 2027/0196* (2013.01); *G06K 2207/1012* (2013.01); *G06K 2209/01* (2013.01); *G06K 2209/03* (2013.01)

(58) Field of Classification Search
CPC .......... G02B 2027/0196; G01C 21/365; B60K 37/06; B60K 2350/2052; G06K 9/00805; G06K 9/00845; G06K 9/00785; G06K 2207/1012; G06K 2209/01
See application file for complete search history.

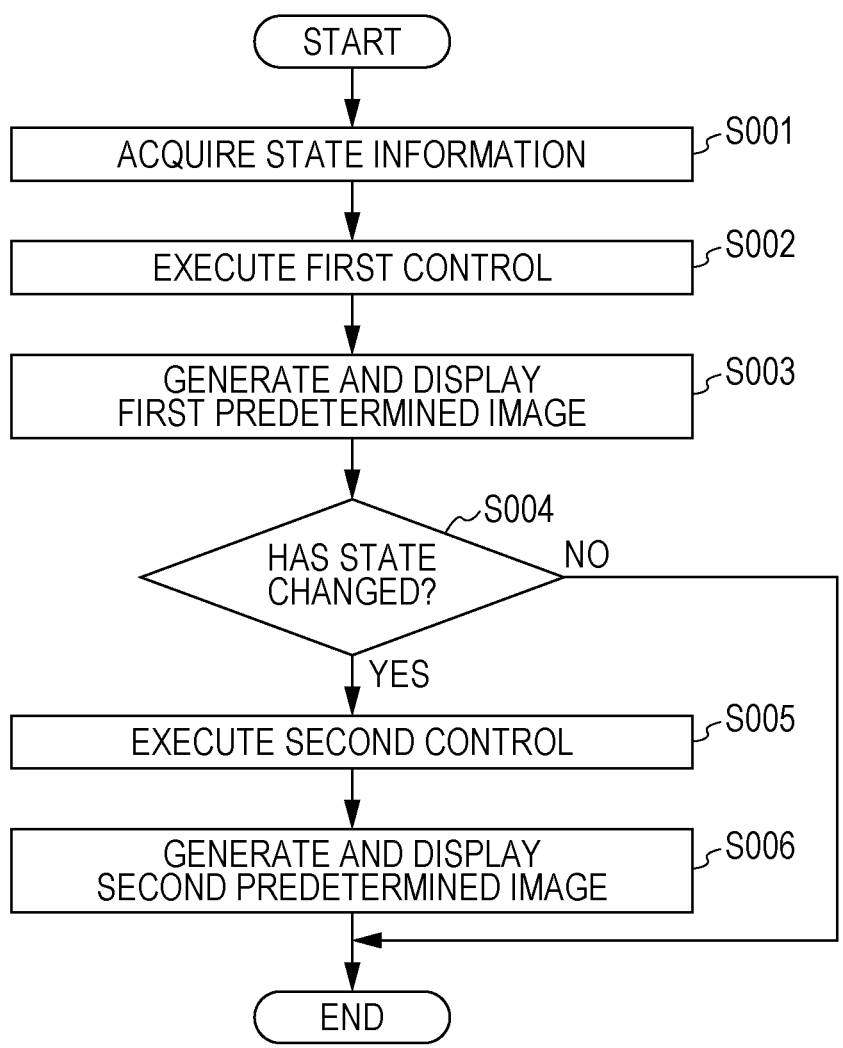

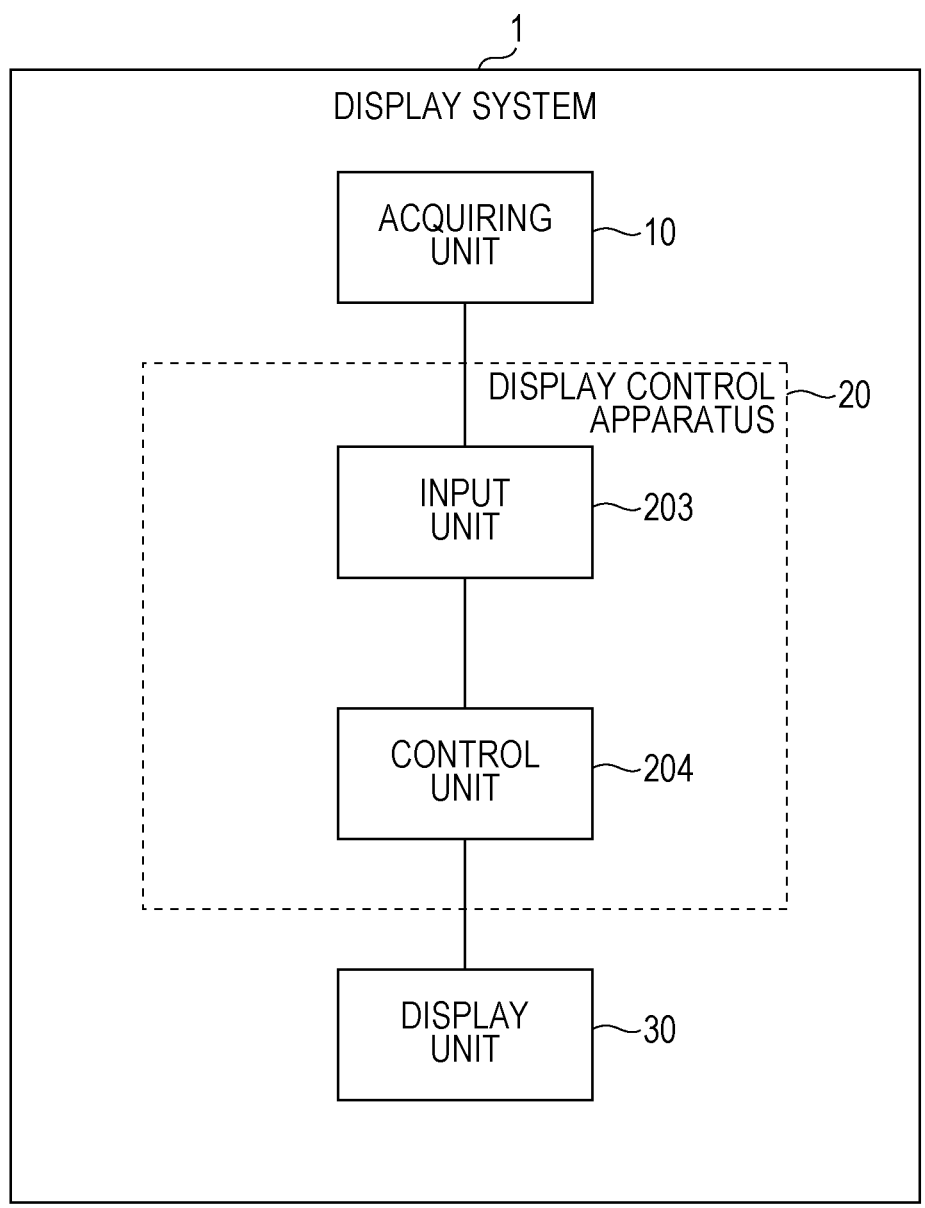

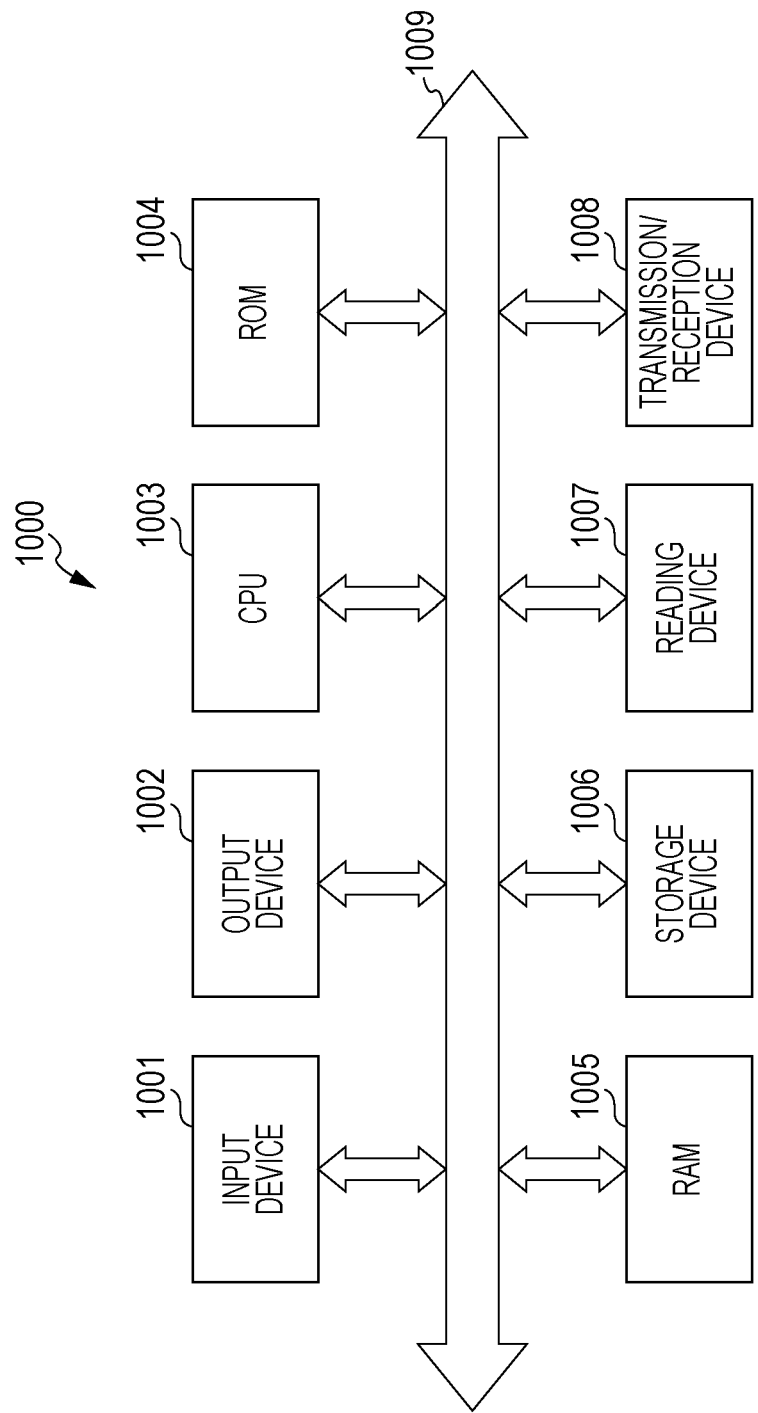

DISPLAY CONTROL APPARATUS, DISPLAY CONTROL METHOD, STORAGE MEDIUM, AND DISPLAY APPARATUS

BACKGROUND

1. Technical Field

The present disclosure relates to a display control apparatus, a display control method, a storage medium, and a display apparatus that control display of information provided to an occupant in a moving object.

2. Description of the Related Art

International Publication No. WO/20131046428 discloses a technology in which a head-up display (HUD) mounted in a vehicle generates a virtual image in front of a windshield and displays an image in a manner that the virtual image is superimposed on a scenery ahead of the vehicle (this technology is hereinafter referred to as "related art"). In this related art, an icon is displayed on a map showing surroundings of the vehicle, and when the vehicle is stopped, control is performed so that text corresponding to the icon is displayed, and when the vehicle is traveling, control is performed so that the text is not displayed. With this arrangement, when the vehicle is stopped, the text is displayed to present detailed information to an occupant in the vehicle, and when the vehicle is traveling, the text is not displayed to thereby make it possible to unnecessarily draw the occupant' attention.

However, in the related art, since no text is displayed during travel of the vehicle, this is inconvenient for the occupant.

SUMMARY

One non-limiting and exemplary embodiment provides a display control apparatus, a display control method, a display control program, and a display apparatus that can display text without unnecessarily drawing an occupant' attention even during travel of a moving object.

In one general aspect, the techniques disclosed here feature a display control apparatus that includes: an input that receives state information indicating at least one of a state of a moving object, a state of inside of the moving object, and a state of outside of the moving object; and a controller that controls a displayer, which generates a predetermined image and outputs the predetermined image onto a display medium, based on the state information. The predetermined image shows a presentation image including text, when the predetermined image is displayed on the display medium. The controller causes the displayer to generate a first predetermined image showing a first presentation image including first text corresponding to a predetermined event, determines whether the at least one state has made a predetermined change, based on the state information, and causes the displayer to generate a second predetermined image showing a second presentation image including second text corresponding to the predetermined event, upon sensing the predetermined change. The first text includes n words (n is an integer greater than or equal to 2), and the second text includes m words of the n words (m is an integer smaller than n) and does not include k words of the n words (k=n−m).

According to the present disclosure, it is possible to display text without unnecessarily drawing an occupant' attention even during travel of a moving object.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a flowchart illustrating an example operation of the display system according to the embodiment of the present disclosure;

FIG. 6 is a block diagram illustrating another example configuration of the display system according to the embodiment of the present disclosure; and FIG. 7 is a block diagram illustrating an example hardware configuration of the display system and a display control apparatus according to the embodiment of the present disclosure.

DETAILED DESCRIPTION

Embodiment

An embodiment of the present disclosure will be described with reference to the accompanying drawings.

Figure 1:
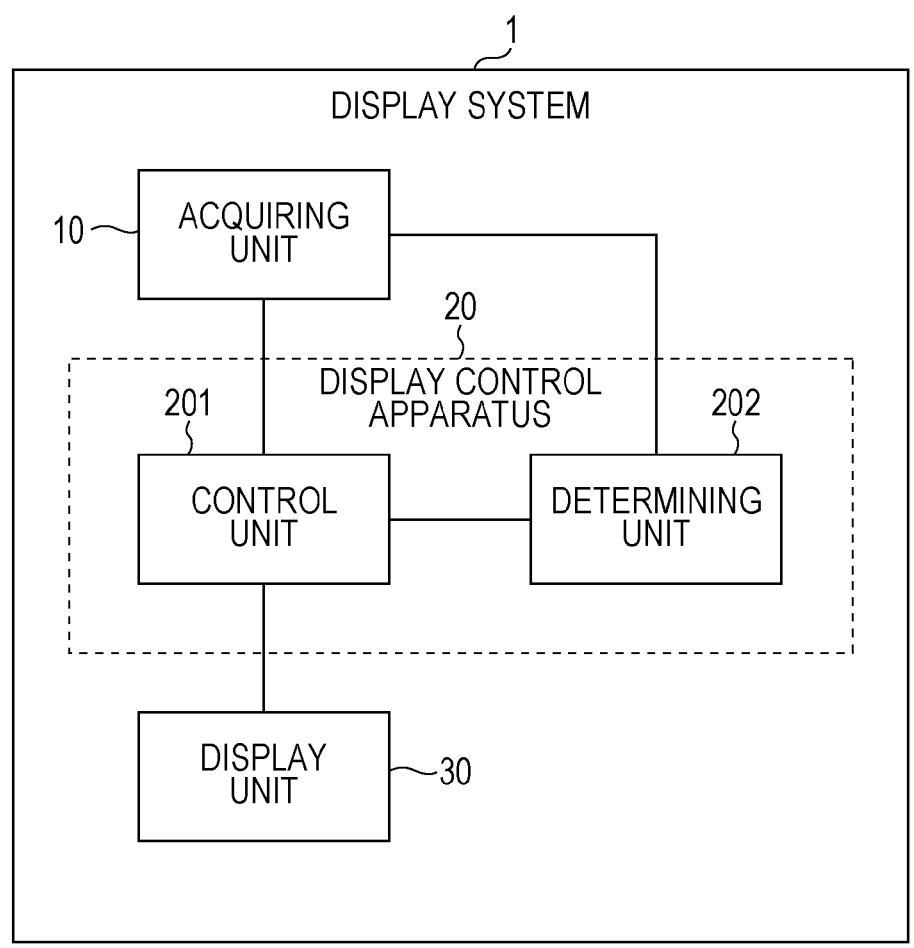
FIG. 1 is a block diagram illustrating an example configuration of a display system according to an embodiment of the present disclosure.

First, an example configuration of a display system 1 according to the present embodiment will be described with reference to FIG. 1. FIG. 1 is a block diagram illustrating an example configuration of the display system 1 according to the present embodiment.

The display system 1 is used in, for example, a vehicle to aid driving of the vehicle. The display system 1 may be vehicle-mounted equipment or may be equipment that is brought into the vehicle. Although an example in which the display system 1 is used in a vehicle is described in the present embodiment, the display system 1 may be used in a moving object (e.g., an airplane, boat, ship, train, or another type of vehicle) or may be used for a wearable computer (e.g., an HMD described below) that a user can wear on his or her body. Although an example in which the user is an occupant in a vehicle, particularly the driver of the vehicle, is described in the present embodiment, the user is not limited thereto.

In FIG. 1, the display system 1 has an acquiring unit 10, a display control apparatus 20, and a display unit 30. The display control apparatus 20 has a control unit 201 and a determining unit 202.

The acquiring unit 10 acquires state information from, for example, a device (e.g., a measurement device, a recognition device, a detecting device, a storage device, or an image processing device) provided on/in the vehicle or a device (e.g., a communication device) provided outside the vehicle. The state information refers to, for example, at least one of the state of the vehicle, the state of the inside of the vehicle, and the state of the outside of the vehicle.

Examples of the state information indicating the state of the vehicle include information about the speed of the vehicle, the remaining amount of fuel in the vehicle, the travel distance of the vehicle, the current location of the vehicle, and a vehicle vibration state that changes depending on a road condition and sensed by a vehicle-mounted sensor.

Examples of the state information indicating the state of the inside of the vehicle include information about the state (e.g., a drowsiness level) of the driver, the station name or program name of a television/radio viewed/listened to in the vehicle, the artist name or music title of content (e.g., music) played in the vehicle, and the contents and/or the reception state of electronic mail, a message of social networking service (SNS), or the like in the vehicle.

Examples of the state information indicating the state of the outside of the vehicle include information about weather, present congestion, a present accident, a regulation in effect, the available space of parking lots, static or dynamic traffic information about a speed limit or a road direction of a road section, road-sign information for a stop or the like, a frequent accident point, or a slippery road section, the type or name of a subject that is present in the vicinity of the vehicle, the distance between the vehicle and a subject, and a positional relationship between the vehicle and a subject. Examples of the "subject" as used herein include another vehicle, a pedestrian, a facility, a building, a traffic light, and a road sign.

During acquisition of any of the aforementioned state information from a device outside the vehicle, the acquiring unit 10 may use any of the communication systems described below. The acquiring unit 10 can use, for example, the Internet, a wireless local area network (LAN), a communication system used for television broadcast or radio broadcast, a communication system used for Vehicle-to-Vehicle (V2V), Vehicle-to-Infrastructure (V2I), Vehicle Information and Communication System (VICS, registered trademark), and dedicated short-range communication (DSRC).

When the acquiring unit 10 acquires the state information, the display unit 30 generates a predetermined image and causes the generated predetermined image to be displayed on a display medium. More specifically, based on control information (e.g., information indicating details of first control or second control described below) input from the control unit 201, the display unit 30 generates a predetermined image (e.g., a first or second predetermined image described below) and projects the generated predetermined image onto a display medium.

The predetermined image may be an image or image data. When the display unit 30 has a projector function, the predetermined image is an image, and the display unit 30 projects the predetermined image onto a display medium. On the other hand, when the display unit 30 has no projector function, the display unit 30 generates image data and outputs the image data onto a display medium.

When the display unit 30 has a projector function, the display medium is, for example, a head-up display (HUD). In this case, the display unit 30 projects the predetermined image onto a display medium so as to cause the occupant in the vehicle to recognize the predetermined image as a virtual image. In the present disclosure, a description will be given below assuming that projecting a predetermined image onto a display medium to cause the occupant to recognize the predetermined image as a virtual image and displaying a predetermined image on a display medium are synonymous with each other. That is, in the following description, an event in which a predetermined image is projected onto an HUD and is viewed by the occupant as a virtual image is referred to as "display".

The display unit 30 has, for example, a projector function and directly projects the generated image onto an HUD, which is a display medium. As a result, the image is displayed on the HUD. Instead of using the projector function, the display unit 30 may use, for example, the principle of holography to cause a virtual image to be displayed on the HUD. When a hologram is used, the display unit 30 may employ a system using a light guide plate that totally internally reflects and guides a group of parallel light beams which satisfies the total internal reflection condition of the light guide plate. Although image data is not directly projected in the system using the light guide plate, unlike a projector, such representation is referred to as "projection" or "display", as in the projector system, for convenience of description.

The display medium is not limited to an HUD. Examples of the display medium include a liquid-crystal display (LCD), an HUD, a head-mounted display or helmet-mounted display (HMD), an eyeglass-type display (smart glasses), a display for navigation, a meter display, and other dedicated displays. The HUD may be, for example, the windshield of the vehicle or a glass surface, a plastic surface, or the like that is additionally provided. The windshield may be, for example, the front glass or may be a side window glass or the rear window glass of the vehicle. In any case, the image is displayed on the display medium.

When the display unit 30 has no projector function, the display medium is, for example, a transmissive display, and the predetermined image generated by the display unit 30 is image data. That is, by outputting the image data to the transmissive display, the display unit 30 causes a presentation image (a viewing image) to be displayed on the transmissive display.

The transmissive display is, for example, a transmissive organic electroluminescent (EL) display or a transparent display employing glass that emits light upon being illuminated with light having a certain wavelength, and the driver can view what is displayed on the transmissive display, at the same time as viewing the background. The transmissive display is also a display medium that transmits light. Since the principle that image data input to the transmissive display is displayed as a presentation image is known ad, a description thereof is not given herein.

In the present embodiment, "output" is defined as a superordinate concept of "projection".

When the acquiring unit 10 acquires the state information, the control unit 201 controls the display unit 30 so as to generate a first predetermined image that serves, when displayed on the display medium, as a viewing image including first text corresponding to a predetermined event and so as to display the first predetermined image on the display medium (this control is referred to as "first control"). For example, by outputting control information indicating details of the first control to the display unit 30, the control unit 201 controls the display unit 30.

The term "viewing image" as used herein refers to an image that is displayed on the display medium and is viewed by the driver. The first predetermined image described above is an image generated by the display unit 30. That is, the viewing image and the first predetermined image have substantially the same content.

Examples of the aforementioned predetermined event include events related to the speed of the vehicle, the remaining amount of fuel in the vehicle, the travel distance of the vehicle, and the current location of the vehicle. Other examples of the predetermined event include events related to the state of the driver, a television/radio viewed/listened to in the vehicle, content (e.g., music or video) played in the vehicle, and the contents and/or the reception state of electronic mail, a message in an SNS, or the like in the vehicle. Examples of the predetermined event include weather, congestion, an accident, a regulation, the state of available parking lots, static or dynamic traffic information about a speed limit or a road direction of a road section, road-sign information for a stop or the like, a frequent accident point, or a slippery road section, a subject that is present in the vicinity of the vehicle, the distance between the vehicle and a subject, and the positional relationship between the vehicle and a subject.

The first text corresponding to the predetermined event may be the same as or different from a state indicated by the stare information acquired by the acquiring unit 10. For example, when the state information indicates that a pedestrian is present 10 m ahead, the first text may be "A pedestrian is ahead" or may include advice or the like for an action, such as "Proceed with caution!" the driver is to take. When the stare information indicates "mail reception", the first text may include a mail attribute or body, such as "Mail has arrived." or "You've got mail from Mr. A. The time of tomorrow's meeting is changed to 10 o'clock".

The determining unit 202 determines whether or not the state indicated by the state information acquired by the acquiring unit 10 has changed. A specific example of this determination process is described below later.

When the determining unit 202 determines that the state has changed, the control unit 201 controls the display unit 30 so as to generate a second predetermined image that serves, when displayed on the display medium, as a viewing image including second text corresponding to the predetermined event and so as to display the second predetermined image on the display medium (this control is referred to as "second control"). For example, by outputting control information indicating details of the second control to the display unit 30, the control unit 201 controls the display unit 30.

The viewing image in this case refers to an image that is displayed on the display medium and is viewed by the driver. The second predetermined image is an image generated by the display unit 30. That is, the viewing image and the second predetermined image have substantially the same content.

Also, the predetermined event for the second text is the same as the predetermined event for the first text.

When the first text includes n words (n is an integer greater than or equal to 2), the second text includes m words of the n words (m is an integer smaller than n) and does not include k words of the n words (k=n−m). For example, the second text is abridged text of the first text.

The display system 1 may have a configuration including the above-described display medium. The display unit 30 may also be included in the display control apparatus 20 to configure a display apparatus.

The above-described first predetermined image or second predetermined image may be generated by the display control apparatus 20 or another constituent element (not illustrated), not by the display unit 30.

The first predetermined image or second predetermined image generated in the display system 1 is viewed, for example, by the driver as a virtual image. In this case, the first predetermined image or second predetermined image may be projected onto the display medium so as to be superimposed on the driver's field of view. Since the principle that a driver views an image projected onto a display medium as a virtual image is known art, a description thereof is not given herein.

The description above has been given of an example configuration of the display system 1 according to the present embodiment.

Next, an example operation of the display system 1 according to the present embodiment will be described with reference to FIG. 2. FIG. 2 is a flowchart illustrating an example operation of the display system 1 according to the present embodiment.

First, the acquiring unit 10 acquires state information (step S001). The state information acquired in this case is assumed to be, for example, subject-type information indicating that the subject is a pedestrian, distance information indicating the distance between the vehicle and the pedestrian, and position information indicating the position (e.g., the left front side) of the pedestrian relative to the vehicle. The acquiring unit 10 acquires the subject-type information, the distance information, and the position information from, for example, a recognizing unit (not illustrated). The recognizing unit obtains a forward-view image of the vehicle, recognizes a subject included in the forward-view image, and generates the subject-type information, the distance information, and the position information, based on a result of the recognition. The state information acquired by the acquiring unit 10 may include information other than the subject-type information, the distance information, and the position information.

Subsequent to step S001, the control unit 201 executes first control (step S002). That is, the control unit 201 controls the display unit 30 so as to generate a first predetermined image that serves, when displayed on the display medium, as a viewing image including first text corresponding to a predetermined event and so as to display the first predetermined image on the display medium. The predetermined event in this case refers to, for example, a state in which a pedestrian is present at the left front side of the vehicle. The first text is assumed to be, for example, a message that draws the driver's attention to a pedestrian present at the left front side of the vehicle. That is, for example, the control unit 201 controls the display unit 30 so as to generate a first predetermined image that serves as a viewing image including first text and so as to display the first predetermined image on the display medium, based on the subject-type information and the position information.

Figure 3A:
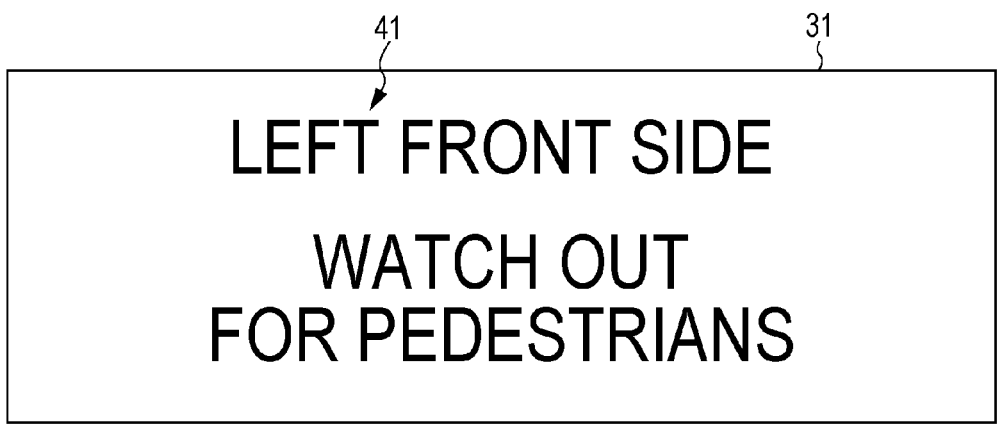
FIGS. 3A and 3B are schematic views of examples of image display according to the embodiment of the present disclosure.

Subsequent to step S002, based on control information (in this case, information indicating details of the first control) input from the control unit 201, the display unit 30 generates the first predetermined image and displays the first predetermined image on the display medium (step S003). FIG. 3A illustrates an example of this display. As illustrated in FIG. 3A, first text 41 indicating that "Left Front Side Watch out for Pedestrians" is displayed on a display medium 31.

Subsequent to step S003, the determining unit 202 determines whether or not the state indicated by the state information has changed (step S004). When the result of the determination indicates that the state has not changed (NO in step S004), the flow ends, and when the state has changed (YES in step S004), the flow proceeds to step S005. In this case, for example, the determining unit 202 determines whether or not the distance indicated by the distance information is smaller than a pre-defined threshold. When the distance is not smaller than the threshold (NO in step S004), the flow ends. On the other hand, when the distance is smaller than the threshold (YES in step S004), the flow proceeds to step S005.

When the distance indicated by the distance information is smaller than the threshold (YES in step S004), the control unit 201 executes second control (step S005). That is, the control unit 201 controls the display unit 30 so as to generate a second predetermined image that serves, when displayed on the display medium, as a viewing image including second text corresponding to the predetermined event and so as to display the second predetermined image on the display medium. The predetermined event in this case is the same as the predetermined event for the first text. That is, the predetermined event in this case is that, for example, a pedestrian is present at the left front side of the vehicle. The second text is also assumed to be, for example, a message having three words extracted from the seven words in the first text 41. The second text having the extracted three words is a message with which the driver can recognize substantially the same contents as the contents of the first text. A known word-extracting technique or abridging technique may be used for a method for extracting the words.

Figure 3B:
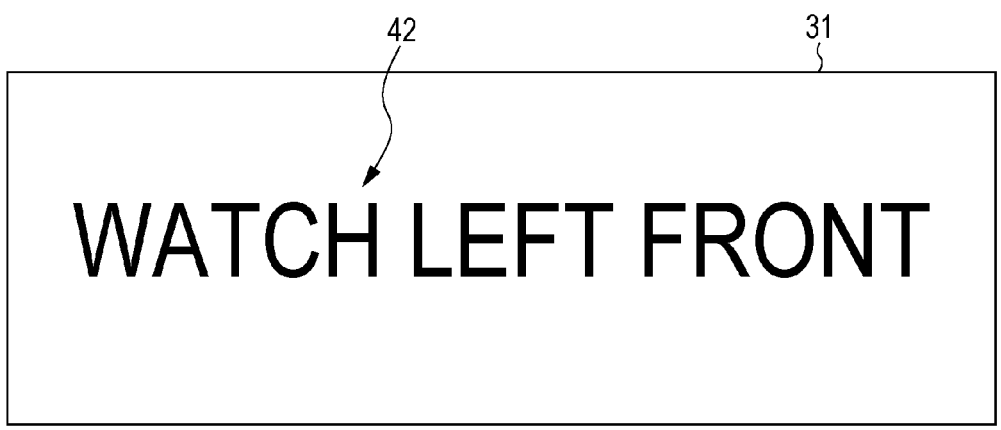

Next, based on the control information (in this case, information indicating details of the second control) input from the control unit 201, the display unit 30 generates the second predetermined image and displays the second predetermined image on the display medium (step S006). FIG. 3B illustrates an example of this display. As illustrated in FIG. 3B, second text 42 indicating "Watch Left Front" is displayed on the display medium 31. The second text 42 is displayed with each character being enlarged, compared with the first text 41. As described above, when the distance between the vehicle and the pedestrian is smaller than the threshold, the second text 42, which is abridged text of the first text 41, is displayed.

Although the above description has been given of a case in which the second text 42 is displayed with each character being enlarged compared with the first text 41, the present disclosure is not limited thereto. For example, each character in the second text 42 may have the same size as the size of each character in the first text 41 or may have a size smaller than the size of each character in the first text 41. The second text 42 may change from the first text 41 at a moment in time or may change from the first text 41 during a certain time period (e.g., 1 second) in a continuous or stepwise manner (e.g., may change in position while chaining the size). In particular, when the first text 41 is changed to the second text 42 in a continuous or stepwise manner, the driver can intuitively recognize that the second text 42 continuously conveys the contents conveyed by the first text 41, without misunderstanding that the second text 42 is a new message different from the first text 41, not only when continuously seeing it but also when intermittententtly seeing it.

Although the above description has been given of a case in which the display modes that are made different between the first text 41 and the second text 42 are the character sizes, the present disclosure is not limited thereto. The display mode may be, in addition to the character size, for example, the thickness of characters, font, color, luminance, decoration applied to characters, or any combination thereof.

Although the above description has been given of a case in which only the first text 41 or only the second text 42 is displayed on the display medium 31, another image may also be displayed together with the first text 41 or the second text 42.

Although the above description has been given of a case in which the determining unit 202 makes the determination on the basis of the distance information, the determining unit 202 may make the determination on the basis of other state information. Two specific examples will be described below.

A first specific example 1 will be described first. The acquiring unit 10 acquires, as the state information, speed information indicating the speed of the vehicle, in addition to the above-described subject-type information, distance information, and position information (step S001). Next, the control unit 201 executes first control (step S002), and the display unit 30 generates and displays a first predetermined image, based on the first control (step S003). Steps S002 and S003 in this case are analogous to, for example, those in the above-described embodiment. That is, the processes in steps S002 and S003 are performed based on the state information other than the speed information. As a result, the first text 41 is displayed on the display medium 31, as illustrated in FIG. 3A. Thereafter, the determining unit 202 determines whether or not the time to collision (TTC), the time being obtained by dividing the distance indicated by the distance information by the speed indicated by the speed information, is smaller than a pre-defined threshold (step S004). When the result of the determination indicates that the TTC is smaller than the threshold (YES in step S004), the control unit 201 executes second control (step S005), and the display unit 30 generates and displays a second predetermined image, based on the second control (step S006). As a result, the second text 42 is displayed on the display medium 31, as illustrated in FIG. 3B. Thus, in this specific example, when the TTC is smaller than the threshold, the second text 42, which is abridged text of the first text 41, is displayed.

Figure 4A:
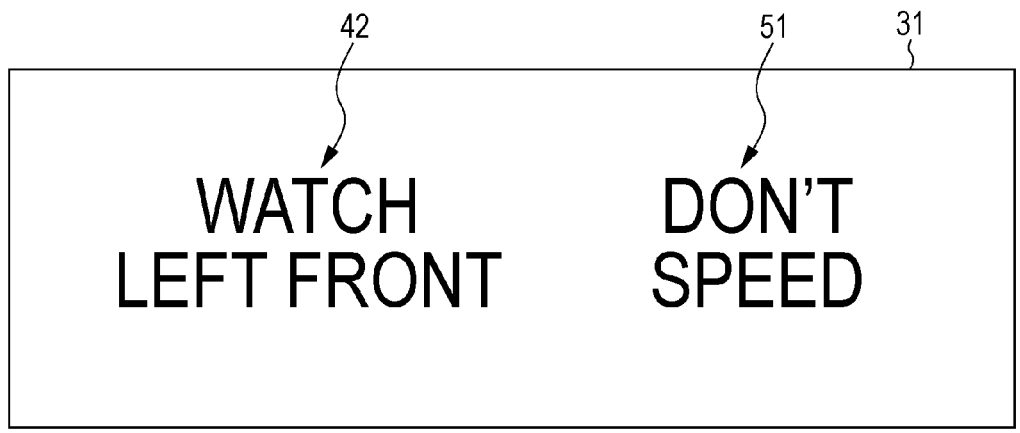
FIGS. 4A and 4B are schematic views of examples of image display according to the embodiment of the present disclosure.

In the first specific example described above, as a result of the second control, the display illustrated in FIG. 4A may be performed. As illustrated in FIG. 4A, first text 51 that is different from the first text 41 may be displayed on the display medium 31 in conjunction with the second text 42. The first text 51 corresponds to, for example, an event in which the speed of the vehicle increases, and is a message for alerting the driver of the speed of the vehicle.

Figure 4B:
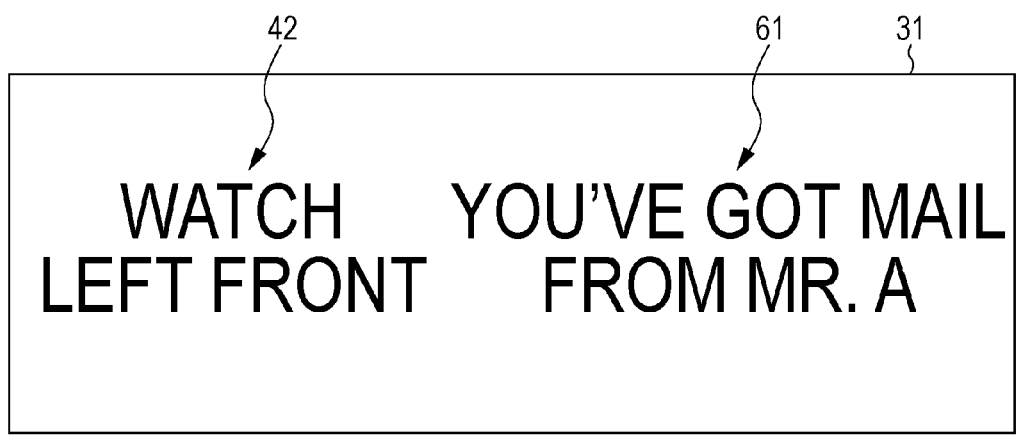

A second specific example will be described next. The acquiring unit 10 acquires, as the state information, reception-state information indicating a mail-reception state (as to whether or not mail is received) in the display system 1, in addition to the above-described subject-type information, distance information, and position information (step S001). Next, the control unit 201 executes first control (step S002), and the display unit 30 generates and displays a first predetermined image, based on the first control (step S003). Steps S002 and S003 in this case are analogous to, for example, those in the above-described embodiment. That is, the processes in steps S002 and S003 are performed based on the state information other than the reception-state information. As a result, the first text 41 is displayed on the display medium 31, as illustrated in FIG. 3A. Thereafter, the determining unit 202 determines whether or not mail is received (step S004). When the result of the determination indicates that mail is received (YES in step S004), the control unit 201 executes second control (step S005), and the display unit 30 generates and displays a second predetermined image, based on the second control (step S006). As a result, the second text 42 is displayed on the display medium 31, as illustrated in FIG. 4B. As described above, in this specific example, when mail is received, the second text 42, which is abridged text of the first text 41, is displayed. Also, in this case, as illustrated in FIG. 4B, first text 61 that is different from the first text 41 may be displayed on the display medium 31 in conjunction with the second text 42. The first text 61 corresponds to, for example, an event in which mail is received, and is a message indicating that mail is received from Mr. A who is a sender.

The above description has been given of an example operation of the display system 1 according to the present embodiment.

As described above, in the present embodiment, it is possible to display text without necessarily drawing the occupant' attention even when the vehicle is traveling.

Although one embodiment of the present disclosure has been described above, the present disclosure is not limited to the embodiment described above, and various modifications are possible thereto. Modifications wifi be described below.

First Modification

Although, in the above-described embodiment, the first predetermined image is an image that serves as a viewing image including first text when displayed on the display medium, the first predetermined image may be an image that serves as a viewing image including first text and an arbitrary image when displayed on the display medium. An example of such an image will be described below with reference to FIGS. 5A and 5B.

First, when the acquiring unit 10 acquires the state information (step S001), the control unit 201 executes first control (step S002). That is, the control unit 201 controls the display unit 30 so as to generate a first predetermined image that serves, when displayed on the display medium, as a viewing image including first text and a first arbitrary image corresponding to a predetermined event and so as to display the first predetermined image on the display medium. The first arbitrary image may or may not be an image corresponding to the predetermined event.

Figure 5A:
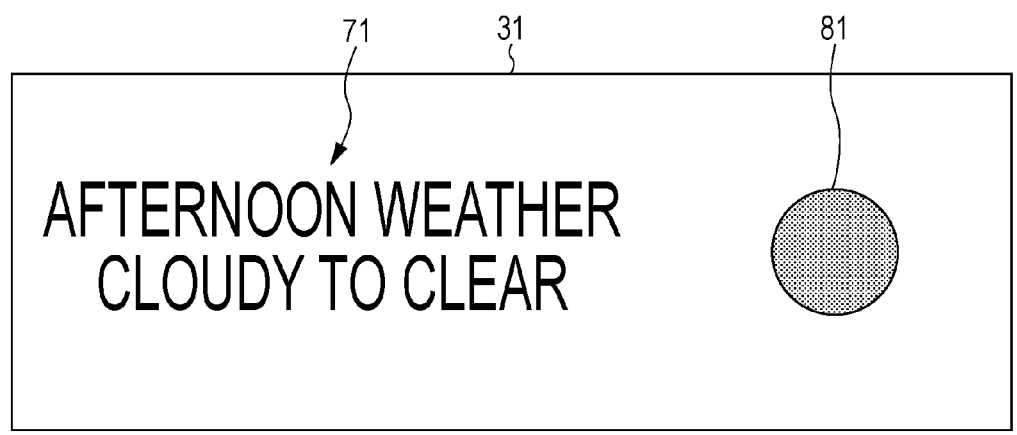
FIGS. 5A and 5B are schematic views of examples of image display according to a modification of the embodiment of the present disclosure.

Subsequent to step S002, based on control information (in this case, information indicating details of the first control) input from the control unit 201, the display unit 30 generates the first predetermined image and displays the first predetermined image on the display medium (step S003). FIG. 5A illustrates an example of this display. As illustrated in FIG. 5A, first text 71 and a first arbitrary image 81 are displayed on the display medium 31. The first text 71 corresponds to, for example, an event relevant to weather and is a message indicating a weather forecast. The first arbitrary image 81 is, for example, but not limited to, an image indicating the speed of the vehicle, an image indicating a speed limit for a road section where the vehicle is traveling, and an image indicating a destination specified by the driver.

When the determining unit 202 determines that the state indicated by the state information has changed (YES in step S004), the control unit 201 executes second control (step S005). That is, the control unit 201 controls the display unit 30 so as to generate a second predetermined image that serves, when displayed on the display medium, as a viewing image including second text and a second arbitrary image and so as to display the second predetermined image on the display medium.

Figure 5B:
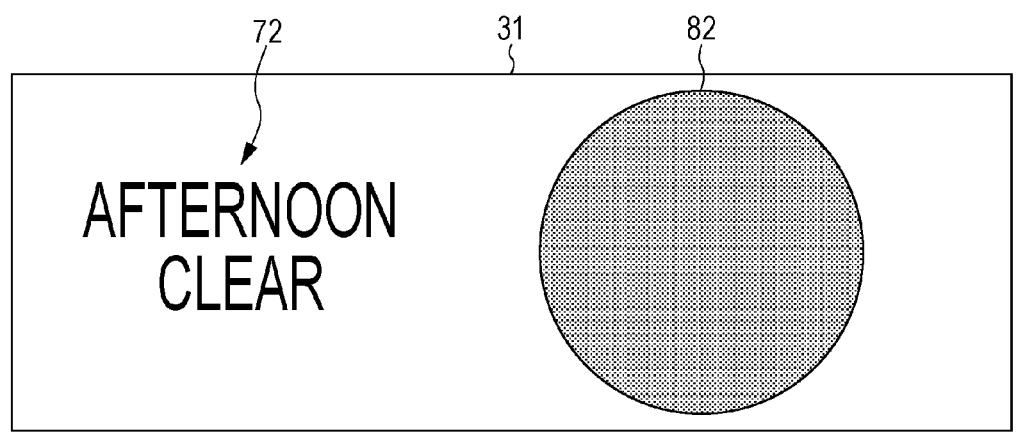

Next, based on control information (in this case, information indicating details of the second control) input from the control unit 201, the display unit 30 generates the second predetermined image and displays the second predetermined image on the display medium (step S006). FIG. 5B illustrates an example of this display. As illustrated in FIG. 5B, second text 72 and a second arbitrary image 82 are displayed on the display medium 31. The second text 72 corresponds to the same event (e.g., weather) as that for the first text and is a message having two words (e.g., Afternoon Clear) extracted from the five words in the first text. The second arbitrary image 82 is an enlarged image of the first arbitrary image 81. The change in the display mode from the first arbitrary image 81 to the second arbitrary image 82 is not limited to image enlargement. For example, the second arbitrary image 82 may be an image obtained by applying predetermined decoration on the first arbitrary image 81.

According to this modification, it is possible to provide the following advantages, in addition to the advantages of the first embodiment described above. That is, in this modification, the second arbitrary image 82 obtained by changing the display mode of the first arbitrary image 81 can be displayed in space created as a result of the change from the display of the first text 71 to the display of the second text 72.

Second Modification

Although, in the embodiment described above, the control unit 201 controls the display unit 30 so as to generate the first predetermined image or the second predetermined image and so as to display the generated first or second predetermined image on the display medium, the present disclosure is not limited thereto. For example, the control unit 201 may control the display unit 30 so as to read a pre-generated first predetermined image or second predetermined image from a predetermined storage device and so as to display the read first or second predetermined image on the display medium.

Third Modification

The state information includes information about a vehicle vibration state. When the vehicle travels on a snowy road, a dirt road, a curved road, or the like, the amount of vibration of the vehicle increases, compared with a case in which the vehicle travels on a regular street. Accordingly, when the control unit 201 determines that the state information indicating vehicle vibration becomes larger than a predetermined value (i.e., senses a predetermined change), the control unit 201 causes the display unit 30 to generate a second predetermined image indicating a second presentation image including second text corresponding to a predetermined event.

In this case, when the first text includes n words (n is an integer greater than or equal to 2), the second text includes m words of the n words (m is an integer smaller than n) and does not include k words of the n words (k=n−m). This offers an advantage that it is easier for the driver to read the second text having less words, that is, m words, even when the vehicle vibrates.

In addition, a process for blurring vertical or horizontal edges may be performed on the second text. This makes it easier for the driver to view the second text even when the vehicle vibrates vertically or horizontally.

When the vehicle travels on a snowy road, a process for reducing the size of the second text may be performed. This makes it possible to reduce the size of characters displayed on the display medium, so as to avoid the driver unnecessarily viewing the second text, thereby making it possible reduce cumbersome display. When the vehicle travels on a snowy road, the second text may be deleted. Whether or not the vehicle is traveling on a snowy road is determined using an image sensor or a radar.

In addition, the second text does not need to include, of the n words in the first text, the k words that are made difficult to read by vibration. This provides an advantage that it is easier for the driver to view the second text even when the vehicle vibrates. The words that are made difficult to read by vibration are pre-determined based on the specifications. For example, complicated kanji characters and complicated symbols are assumed to be words that are made difficult to read by vibration. The type of vibration and the types of mode change in words/characters and images are not limited to those described above.

Fourth Modification

The configuration of the display system 1 is not limited to the configuration illustrated in FIG. 1. Another example configuration of the display system 1 will now be described with reference to FIG. 6. FIG. 6 is a block diagram illustrating another example configuration of the display system 1 according to the present embodiment. Differences from the example configuration illustrated in FIG. 1 will be described below.

The display control apparatus 20 includes an input unit 203 and a control unit 204.

The input unit 203 receives state information from the acquiring unit 10. The state information is information indicating, for example, at least one of the state of the vehicle, the state of inside of the vehicle, and the state of outside of the vehicle. The control unit 204 has functions that are the same as or similar to those of the control unit 201 and the determining unit 202 illustrated in FIG. 1. Based on the state information, the control unit 204 controls the display unit 30, which generates a predetermined image and outputs the predetermined image onto the display medium.

More specifically, the control unit 204 causes the display unit 30 to generate a first predetermined image showing a first presentation image (a viewing image) including first text corresponding to a predetermined event. The control unit 204 then determines a change in the state indicated by the state information.

When the state indicated by the state information has changed, the control unit 204 causes the display unit 30 to generate a second predetermined image, which serves as a viewing image including second text corresponding to the predetermined event.

The above description has been given of some modifications of the embodiment of the present disclosure. The above-described modifications may be arbitrary combined together.

The functions of the individual constituent elements of the display system 1 and the display control apparatus 20 can be implemented by a computer program.

FIG. 7 is a diagram illustrating a hardware configuration of a computer that realizes the functions of the individual constituent elements by using a program. This computer 1000 has an input device 1001, such as an input button and/or a touch pad, an output device 1002, such as a display and/or a speaker, a central processing unit (CPU) 1003, a read only memory (ROM) 1004, and a random access memory (RAM) 1005. The computer 1000 further includes a storage device 1006, such as a hard-disk device or a solid-state drive (SSD), a reading device 1007 that reads information from a storage medium, such as a digital versatile disk read-only memory (DVD-ROM) or a Universal Serial Bus (USB) memory, and a transmission/reception device 1008 that performs communication over a network. These elements are connected through a bus 1009.

The reading device 1007 reads a program for realizing the functions of the above-described constituent elements from a storage medium on which the program is recorded, and the read program is stored in the storage device 1006. Alternatively, the transmission/reception device 1008 communicates with a server apparatus connected to the network, downloads, from the server apparatus, a program for realizing the functions of the above-described constituent elements, and stores the downloaded program in the storage device 1006.

The CPU 1003 copies the program stored in the storage device 1006 to the RAM 1005, sequentially reads instructions included in the program from the RAM 1005, and executes the instructions to thereby realize the functions of the above-described constituent elements. Also, during execution of the program, information resulting from the various processes described above in the embodiment is stored in the RAM 1005 or the storage device 1006 and is used, as appropriate.

The present disclosure is useful for a display control apparatus, a display control method, a display control program, and a display apparatus that control display of information provided to a user (e.g., an occupant in a vehicle or the like or a user wearing a display device).

What is claimed is:

1. A display control apparatus comprising:
    input circuitry, which in operation, receives state information indicating at least one of a state of a moving object, a state of inside of the moving object, and a state of outside of the moving object; and
    control circuitry, which in operation, controls a display, which generates a predetermined image and outputs the predetermined image onto a display medium, based on the state information,
    wherein the predetermined image shows a presentation image including text, when the predetermined image is displayed on the display medium;
    wherein the control circuitry:
        causes the display to generate a first predetermined image showing a first presentation image including first text corresponding to a predetermined event,
        determines whether the at least one state has made a predetermined change, based on the state information, and
        causes the display to generate a second predetermined image showing a second presentation image including second text corresponding to the predetermined event instead of the first presentation image including the first text, upon sensing the predetermined change; and
    wherein the first text is composed of n words, and the second text is an abridged form of the first text and is composed of l words including m words of the n words and does not include k words of the n words,
    wherein n is an integer greater than or equal to 2,
    wherein l is an integer, 1<n,
    wherein m is an integer, m<=1, and
    wherein k is an integer, k=1−m.

2. The display control apparatus according to claim 1,
    wherein the state information comprises distance information indicating a distance between a subject that is present ahead of the moving object and the moving object; and
    the predetermined change is a change from a state in which the distance is larger than a pre-defined threshold to a state in which the distance is smaller than or equal to the threshold.

3. The display control apparatus according to claim 1,
    wherein the state information comprises speed information indicating a speed of the moving object; and the predetermined change is a change from a state in which the speed is lower than a pre-defined threshold to a state in which the speed is higher than the threshold.

4. The display control apparatus according to claim 1, wherein the state information comprises reception-state information indicating a reception state of mail; and the predetermined change is a change from a state in which no mail is received to a state in which mail is received.

5. The display control apparatus according to claim 1, wherein the control circuitry causes the display to generate a third predetermined image showing a third presentation image including the first text and a first arbitrary image; and causes the display to generate, after generating the third predetermined image, a fourth predetermined image showing a fourth presentation image including the second text and a second arbitrary image, when the state has made the predetermined change; and wherein the second arbitrary image is an image obtained by changing a display mode of the first arbitrary image.

6. The display control apparatus according to claim 5, wherein the second arbitrary image is an enlargement image of the first arbitrary image, and is located in a space generated by shortening the first text.

7. A display control method for a display system including display, wherein state information is acquired indicating at least one of a state of a moving object, a state of inside of the moving object, and a state of outside of the moving object, and based on the state information, the display generates a predetermined image that shows, when displayed on a display medium, a presentation image including text and outputs the predetermined image onto the display medium, the display control method comprising:

causing the display to generate a first predetermined image showing a first presentation image including first text corresponding to a predetermined event;

determining whether the at least one state has made a predetermined change, based on the state information; and causing the display to generate a second predetermined image showing a second presentation image including second text corresponding to the predetermined event instead of the first presentation image including the first text, after the sensing, wherein the first text is composed of n words, and the second text is an abridged form of the first text and is composed of l words including m words of the n words and does not include k words of the n words, wherein n is an integer greater than or equal to 2, wherein l is an integer, 1<n, wherein m is an integer, m<=1, and wherein k is an integer, k=1−m.

8. A computer-readable non-transitory tangible storage medium storing a display control program executed by a display control apparatus in a display system including display, wherein state information is acquired indicating at least one of a state of a moving object, a state of inside of the moving object, and a state of outside of the moving object, and based on the state information, the display generates a predetermined image that shows, when displayed on a display medium, a presentation image including text and outputs the predetermined image onto the display medium, the display control program causing a computer in the display control apparatus to execute:

causing the display to generate a first predetermined image showing a first presentation image including first text corresponding to a predetermined event;

determining whether the at least one state has made a predetermined change, based on the state information; and causing the display to generate a second predetermined image showing a second presentation image including second text corresponding to the predetermined event instead of first presentation image including first text, after the sensing, and wherein the first text is composed of n words, and the second text is an abridged form of the first text and is composed of l words including m words of the n words and does not include k words of the n words, wherein n is an integer greater than or equal to 2, wherein l is an integer, 1<n, wherein m is an integer, m<=1, and wherein k is an integer, k=1−m.

* * * * *